United States Patent
Taguchi et al.

(10) Patent No.: US 11,426,903 B2
(45) Date of Patent: Aug. 30, 2022

(54) POWDERY LIQUID-CRYSTAL RESIN FOR PRESS-MOLDED ARTICLE, PRESS-MOLDED ARTICLE, AND PRODUCTION METHOD THEREFOR

(71) Applicant: Polyplastics Co., Ltd., Tokyo (JP)

(72) Inventors: Yoshiaki Taguchi, Fuji (JP); Tatsuya Kawasaki, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 17/311,032

(22) PCT Filed: Dec. 6, 2019

(86) PCT No.: PCT/JP2019/047786
§ 371 (c)(1),
(2) Date: Jun. 4, 2021

(87) PCT Pub. No.: WO2020/116605
PCT Pub. Date: Jun. 11, 2020

(65) Prior Publication Data
US 2021/0354342 A1    Nov. 18, 2021

(30) Foreign Application Priority Data

Dec. 6, 2018 (JP) .............................. JP2018-228723

(51) Int. Cl.
| | | |
|---|---|---|
| B29C 43/00 | (2006.01) | |
| B29C 43/52 | (2006.01) | |
| B29K 67/00 | (2006.01) | |
| B29K 105/00 | (2006.01) | |

(52) U.S. Cl.
CPC .......... B29C 43/006 (2013.01); B29C 43/003 (2013.01); B29C 43/52 (2013.01); *B29K 2067/003* (2013.01); *B29K 2105/0079* (2013.01); *B29K 2105/251* (2013.01); *B29K 2995/0063* (2013.01)

(58) Field of Classification Search
CPC . B29C 44/3402; B29C 44/422; B29C 45/001; B29C 45/0046; B29C 45/12; B29C 45/781; B29C 45/2642; B29C 45/78; B29C 2945/7604; B29C 2791/006; B29C 43/006; B29C 43/184
See application file for complete search history.

(56) References Cited

U.S. PATENT DOCUMENTS

| | | | | |
|---|---|---|---|---|
| 2008/0048150 | A1* | 2/2008 | Hosoda | C08K 3/22 252/299.5 |
| 2015/0294754 | A1 | 10/2015 | Ohata | |
| 2019/0080817 | A1 | 3/2019 | Ohata | |

FOREIGN PATENT DOCUMENTS

| | | |
|---|---|---|
| JP | 2004-68004 A | 3/2004 |
| JP | 2008-30397 A | 2/2008 |
| JP | 2010-31104 A | 2/2010 |
| JP | 2013-208791 A | 10/2013 |
| JP | 2017-155085 A | 9/2017 |
| WO | 2014/188830 A1 | 11/2014 |
| WO | 2017/150336 A1 | 9/2017 |

OTHER PUBLICATIONS

International Search Report dated Mar. 3, 2020, issued in counterpart International Application No. PCT/JP2019/047786. (2 pages).
Decision to Grant a Patent dated Oct. 13, 2020, issued in counterpart of Japanese Patent Application No. 2020-524653, with English Translation (5 pages).

* cited by examiner

*Primary Examiner* — Stella K Yi
(74) *Attorney, Agent, or Firm* — WHDA, LLP

(57) ABSTRACT

A powdery liquid-crystal resin for a press-molded article is disclosed having a bulk density of more than 0.05 g/cm$^3$ and 0.5 g/cm$^3$ or less. The powdery liquid-crystal resin preferably has a particle diameter distribution width as defined by JIS Z8825: 2013 of 3.0 or more and 12 or less. The powdery liquid-crystal resin preferably has an average particle diameter of 10 μm or more and 300 μm or less. The degree of crystallinity of the powdery liquid-crystal resin is preferably 20% or more and 70% or less.

1 Claim, No Drawings

POWDERY LIQUID-CRYSTAL RESIN FOR PRESS-MOLDED ARTICLE, PRESS-MOLDED ARTICLE, AND PRODUCTION METHOD THEREFOR

TECHNICAL FIELD

The present invention relates to a powdery liquid-crystal resin for a press-molded article, a press-molded article, and a production method therefor.

BACKGROUND ART

Liquid-crystal resins represented by liquid-crystal polyester resins are excellent in high flowability, low flashing, reflow resistance, and the like, and are therefore widely used in various fields. Meanwhile, liquid-crystal resins have a characteristic of orienting (orientation) in the resin flow direction during mold cooling. Thus, the resulting molded article can have an anisotropy in which physical properties differ between the resin flow direction and the direction perpendicular thereto. For this reason, much of the prior research on press-molded articles of liquid-crystal resins has been related to technology for counteracting the anisotropy, such as improving dimensional accuracy. Patent Document 1 describes a method for producing a liquid crystal resin sheet in which two types of liquid crystal resins are each pulverized to a predetermined average particle diameter range, mixed, and then hot-press molded at a predetermined temperature. It is considered that the thickness of the sheet can be easily adjusted according to this method. Patent Document 2 describes a method for producing modified liquid crystal polyester particles in which irregularly shaped particles comprising a liquid crystal polyester are spheroidized with a high-speed airflow impact method. It is considered that a molded plate with very good thickness accuracy can be obtained when a large-sized molding plate is obtained by means of hot-press molding according to this method. Hot-press molding is a molding method in which a resin powder is heat-press molded at a temperature at which the resin melts, and can suppress the orientation of a liquid-crystal resin so as to be small compared to that in injection molding in which a resin is melted at a high temperature at which the resin flows. However, press molding must be performed at a high pressure in order to improve the mechanical strength of the resulting molded article. Press molding at a high pressure can result not only in the occurrence of flash but also orientation due to the flowing of the resin accompanying the occurrence of flash. In this case, strength may decrease without the anisotropy of the molded article being sufficiently counteracted.

CITATION LIST

Patent Literature

Patent Document 1: JP 2008-30397 A
Patent Document 2: JP 2010-31104 A

SUMMARY OF INVENTION

Technical Problem

The present invention addresses the problem of providing a powdery liquid-crystal resin enabling the production of a press-molded article with high mechanical strength, a press-molded article using the same, and a production method therefor.

Solution to Problem

Conventionally, it has been considered preferable to use particles with high bulk density, such as spherical fine particles, in order to increase the mechanical strength of molded articles formed using powdery resins. However, in the process of research for improving the mechanical strength of press-molded articles using powdery liquid-crystal resins, the present inventors have surprisingly found that press-molded articles formed using powdery liquid-crystal resins comprising fine particles with low bulk density such as fibrillar fine particles, rather than particles with high bulk density such as spherical fine particles, can achieve higher mechanical strength. The present inventors conducted further research and learned that it is possible to obtain a molded article having higher mechanical strength by using a powdery liquid-crystal resin having a predetermined bulk density, and this led to the completion of the present invention. Specifically, the present invention relates to the following.

[1] A powdery liquid-crystal resin for a press-molded article, having a bulk density of more than 0.05 $g/cm^3$ and 0.5 $g/cm^3$ or less.

[2] The powdery liquid-crystal resin according to [1], wherein a particle diameter distribution width as defined by JIS Z8825: 2013 is 3.0 or more and 12 or less.

[3] The powdery liquid-crystal resin according to [1] or [2], wherein an average particle diameter is 10 μm or more and 300 μm or less.

[4] The powdery liquid-crystal resin according to any of [1] to [3], wherein a degree of crystallinity is 20% or more and 70% or less.

[5] The powdery liquid-crystal resin according to any of [1] to [4], wherein a difference ΔTm (Tm2−Tm1 onset temperature) between a melting point Tm2 and an onset temperature of a melting point Tm1 measured by a differential scanning calorimeter is 30° C. or more and 90° C. or less.

[6] The powdery liquid-crystal resin according to any of [1] to [5], wherein the melting point Tm2 measured by a differential scanning calorimeter is 250° C. or more and 400° C. or less.

[7] The powdery liquid-crystal resin according to any of [1] to [6], wherein a melt viscosity measured at a cylinder temperature 10 to 30° C. higher than the melting point Tm2 measured by a differential scanning calorimeter and a shear rate of 100 $sec^{-1}$ is 10 Pa·s or more and 1000 Pa·s or less.

[8] The powdery liquid-crystal resin according to any of [1] to [7], wherein a ratio of a maximum particle diameter and the average particle diameter (maximum particle diameter/average particle diameter) is 5 or less.

[9] A press-molded article of the powdery liquid-crystal resin according to any of [1] to [8].

[10] A production method for a press-molded article, the method comprising a hot-pressing step of press-molding the powdery liquid-crystal resin according to any of [1] to [8] at a temperature equal to or more than (the melting point Tm2 measured by a differential scanning calorimeter−60)° C.

[11] A production method for a press-molded article, the method comprising a cold pressing step of press-molding the powdery liquid-crystal resin according to any of [1] to [8] at a temperature equal to or less than a glass transition point, and a hot pressing step of press-molding a molded article obtained in the cold pressing step at a temperature equal to or more than (the melting point Tm2 measured by a differential scanning calorimeter−60)° C. of the powdery liquid-crystal resin.

Effects of Invention

According to the present invention, it is possible to provide a powdery liquid-crystal resin enabling the production of a press-molded article with high mechanical strength, a press-molded article using the same, and a production method therefor.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered.

[Powdery Liquid-Crystal Resin]

As used herein, the term "powdery" means being composed of fine particles having an average particle diameter of around 0.1 μm to 1000 μm, and "average particle diameter" means a volume-based arithmetic average particle diameter based on a laser diffraction/scattering particle diameter distribution measurement method. The average particle diameter can be measured using, for example, laser diffraction/scattering particle diameter distribution analyzer LA-960, manufactured by HORIBA, Ltd. "Liquid-crystal" means having properties capable of forming an optically anisotropic melt phase. The properties of the anisotropic melt phase can be confirmed by a common polarization test method utilizing crossed polarizers. More specifically, the confirmation of the anisotropic melt phase can be carried out by observing a melted sample placed on a Leitz hot stage at ×40 magnification in a nitrogen atmosphere using a Leitz polarizing microscope. When inspected between the crossed polarizers, the liquid-crystal resin normally allows polarized light to pass therethrough even in a melted and stationary state, thus exhibiting optical anisotropy.

The liquid-crystal resin preferably includes at least one selected from a liquid-crystal polyester and a liquid-crystal polyester amide. The liquid-crystal polyester and the liquid-crystal polyester amide are not particularly limited, but are preferably an aromatic polyester or an aromatic polyester amide, and more preferably include at least one resin selected from a wholly aromatic polyester and a wholly aromatic polyester amide. In addition, it is also possible to use a polyester partially containing an aromatic polyester or an aromatic polyester amide within the same molecular chain.

The aromatic polyester or the aromatic polyester amide is particularly preferably an aromatic polyester or an aromatic polyester amide having an aromatic hydroxycarboxylic acid as a structural component.

More specifically, examples of the aromatic polyester or the aromatic polyester amide include:

(1) a polyester mainly comprising one or more of an aromatic hydroxycarboxylic acid and derivatives thereof;

(2) a polyester mainly comprising (a) one or more of an aromatic hydroxycarboxylic acid and derivatives thereof, and (b) one or more of an aromatic dicarboxylic acid, an alicyclic dicarboxylic acid, and derivatives thereof;

(3) a polyester mainly comprising (a) one or more of an aromatic hydroxycarboxylic acid and derivatives thereof, (b) one or more of an aromatic dicarboxylic acid, an alicyclic dicarboxylic acid, and derivatives thereof, and (c) one or more of an aromatic diol, an alicyclic diol, an aliphatic diol, and derivatives thereof;

(4) a polyester amide mainly comprising (a) one or more of an aromatic hydroxycarboxylic acid and derivatives thereof, (b) one or more of an aromatic hydroxyamine, an aromatic diamine, and derivatives thereof, and (c) one or more of an aromatic dicarboxylic acid, an alicyclic dicarboxylic acid, and derivatives thereof; and (5) a polyester amide mainly comprising (a) one or more of an aromatic hydroxycarboxylic acid and derivatives thereof, (b) one or more of an aromatic hydroxyamine, an aromatic diamine, and derivatives thereof, (c) one or more of an aromatic dicarboxylic acid, an alicyclic dicarboxylic acid, and derivatives thereof, and (d) one or more of an aromatic diol, an alicyclic diol, an aliphatic diol, and derivatives thereof. Furthermore, a molecular weight regulator may be used in combination with the above-mentioned structural components as needed.

Preferable specific examples of the specific compounds (monomers) constituting the liquid-crystal polyester and the liquid-crystal polyester amide include: aromatic hydroxycarboxylic acids such as 4-hydroxybenzoic acid and 6-hydroxy-2-naphthoic acid, aromatic diols such as 2,6-dihydroxynaphthalene, 1,4-dihydroxynaphthalene, 4,4'-dihydroxybiphenyl, hydroquinone, resorcin, compounds represented by general formula (I) below, and compounds represented by general formula (II) below; aromatic dicarboxylic acids such as terephthalic acid, isophthalic acid, 4,4'-diphenyldicarboxylic acid, 2,6-naphthalenedicarboxylic acid, and compounds represented by general formula (III) below; and aromatic amines such as p-aminophenol and p-phenylenediamine.

[Chemical Formula 1]

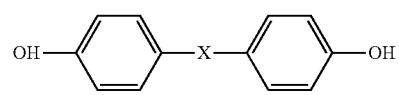

(1)

wherein X is a group selected from alkylene ($C_1$ to $C_4$), alkylidene, —O—, —SO—, —$SO_2$—, —S—, and —CO—.

[Chemical Formula 2]

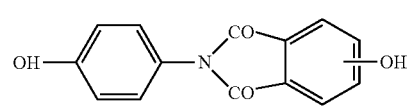

(II)

[Chemical Formula 3]

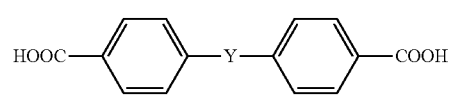

(III)

wherein Y is a group selected from —$(CH_2)_n$— (n=1 to 4) and —$O(CH_2)_nO$— (n=1 to 4).

The production method for the liquid-crystal polyester and the liquid-crystal polyester amide is not particularly limited, and the liquid-crystal polyester and the liquid-crystal polyester amide can be produced by a known method using a monomer compound (or a monomer mixture) described above and a direct polymerization method or a transesterification method. However, normally, a melt polymerization method, a solution polymerization method, a slurry polymerization method, a solid phase polymerization method, and the like or a combination of two or more thereof is used, and a melt polymerization method or a combination of a melt polymerization method and a solid phase polymerization method is preferably used. In the case of compounds having an ester-forming ability, the compounds may be used, as is, for the polymerization. In addition, compounds that have been modified from precursors into derivatives having the ester-forming ability using an acylating agent and the like in a step prior to the polymerization may be used. Examples of acylating agents include a carboxylic acid anhydride such as an acetic anhydride.

Various catalysts can be used in the polymerization. Examples of representative catalysts that can be used include metal salt-based catalysts such as potassium acetate, magnesium acetate, stannous acetate, tetrabutyl titanate, lead acetate, sodium acetate, antimony trioxide, and tris(2, 4-pentanedionato)cobalt(III), and organic compound-based catalysts such as N-methylimidazole and 4-dimethylaminopyridine. The amount of the catalyst used is generally about 0.001 to 1% by mass and particularly preferably about 0.01 to 0.2% by mass relative to the total weight of the monomer.

The liquid-crystal resin can be blended with various types of fibrous, granular, or plate-like inorganic and organic fillers at each production stage. Examples of fibrous fillers include inorganic fibrous substances such as glass fibers, milled glass fibers, carbon fibers, asbestos fibers, silica fibers, silica-alumina fibers, alumina fibers, zirconia fibers, boron nitride fibers, silicon nitride fibers, boron fibers, potassium titanate fibers, silicate fibers such as wollastonite, magnesium sulfate fibers, aluminum borate fibers, and further, metal fibrous substances such as stainless steel, aluminum, titanium, copper, and brass. A particularly representative fibrous filler is glass fibers. Organic fibrous substances having a high melting point such as polyamides, fluororesins, polyester resins, and acrylic resins can also be used.

Examples of granular fillers include carbon black, graphite, silica, quartz powder, glass beads, glass balloons, glass powder, silicates such as calcium silicate, aluminum silicate, kaolin, clay, diatomaceous earth, and wollastonite, metal oxides such as iron oxide, titanium oxide, zinc oxide, antimony trioxide, and alumina, metal carbonates such as calcium carbonate and magnesium carbonate, metal sulfates such as calcium sulfate and barium sulfate, and others such as ferrite, silicon carbide, silicon nitride, boron nitride and various metal powders.

Examples of plate-like fillers include mica, glass flakes, talc, and various metal foils.

The organic fillers and inorganic fillers can be used alone or in combination of two or more thereof.

The content of the filler can be 0 to 100 parts by mass in relation to 100 parts by mass of the liquid-crystal resin.

In addition, the liquid-crystal resin can be blended with additives such as antioxidants, thermal stabilizers, ultraviolet absorbers, lubricants, pigments, and nucleating agents as other components.

The powdery liquid-crystal resin has a bulk density of more than 0.05 g/cm$^3$ and 0.5 g/cm$^3$ or less, preferably 0.06 g/cm$^3$ or more and 0.4 g/cm$^3$ or less, and more preferably 0.07 g/cm$^3$ or more and 0.3 g/cm$^3$ or less. A powdery liquid-crystal resin having a bulk density of more than 0.05 g/cm$^3$ and 0.5 g/cm$^3$ or less makes it possible to produce molded articles having high mechanical strength by means of hot-press molding. The bulk density can be measured using a powder flowability analyzer. Herein, bulk density is a value measured by the method of compaction using FT4 Powder Rheometer manufactured by Freeman Technology. A method for adjusting bulk density is described below.

The powdery liquid-crystal resin preferably has a particle diameter distribution width as defined by JIS Z 8825: 2013 of 3.0 or more and 12 or less, more preferably 3.5 or more and 11 or less, and even more preferably 4.0 or more and 10 or less. By setting the particle diameter distribution width to 3.0 or more and 12 or less, it is possible to further increase the mechanical strength of molded articles that are obtained by means of hot-press molding. "Particle diameter distribution width" means the ratio of D90 (90% cumulative particle diameter) and D10 (10% cumulative particle diameter). The particle diameter distribution width can be measured using, for example, laser diffraction/scattering particle diameter distribution analyzer LA-960, manufactured by HORIBA, Ltd. A method for adjusting particle diameter distribution width is described below.

The average particle diameter of the powdery liquid-crystal resin is preferably 10 μm or more and 300 μm or less, more preferably 10 μm or more and 100 μm or less, and even more preferably 50 μm or more and 80 μm or less. The average particle diameter can also be 10 μm or more and 50 μm or less. By setting the average particle diameter to 10 m or more and 300 μm or less, it is possible to further increase the mechanical strength of molded articles that are obtained by means of hot-press molding. The method for measuring the average particle diameter is as described above. A method for adjusting the average particle diameter is described below.

The powdery liquid-crystal resin preferably has a ratio of a maximum particle diameter and an average particle diameter (maximum particle diameter/average particle diameter) of 5 or less, more preferably 2.5 or less. The lower limit is not particularly limited and can be 1 or more. "Maximum particle diameter" means the maximum value among the values measured by the laser diffraction/scattering particle diameter distribution analyzer. By setting the ratio of the maximum particle diameter and the average particle diameter (maximum particle diameter/average particle diameter) to 5 or less, it is possible to improve powder flowability when hot-press molding.

The degree of crystallinity of the powdery liquid-crystal resin is preferably 20% or more and 70% or less, more preferably 22% or more and 68% or less, even more preferably 25% or more and 65% or less, and particularly preferably 30% or more and 65% or less. By setting the degree of crystallinity of the powdery liquid-crystal resin to 20% or more and 70% or less, it is possible to decrease the orientation of the resin during hot-press molding and to produce hot-press-molded articles with a small anisotropy. In addition, it is possible to further increase the strength and thermal resistance of hot-press-molded articles. The degree of crystallinity can be measured by means of an X-ray diffraction device. If the degree of crystallinity is less than the above-mentioned range, it is possible to adjust the degree of crystallinity into the above-mentioned range by thermally treating the liquid-crystal resin. For example, it is possible to adjust the degree of crystallinity into the above-mentioned range by thermally treating the liquid-crystal resin at a temperature range of from a glass transition point Tg or more to a melting point Tm2 or less. The glass transition point Tg can be measured by means of dynamic viscoelastic measurement.

Adjustment of the degree of crystallinity is not particularly limited and the degree of crystallinity can be adjusted by, for example, performing a thermal treatment at a temperature that is equal to or more than the glass transition point.

The melting point Tm2 of the powdery liquid-crystal resin measured with a differential scanning calorimeter is preferably 250° C. or more and 400° C. or less, more preferably 260° C. or more and 380° C. or less, and even more preferably 280° C. or more and 350° C. or less. By setting the melting point Tm2 to 250° C. or more and 400° C. or less, it is possible to decrease the orientation of the resin when hot-press molding and to produce hot-press-molded articles with a small anisotropy. In addition, it is possible to further increase the strength and thermal resistance of hot-press-molded articles.

According to a method based on JIS K-7121 (1999), the peak top temperature (melting point Tm1) of an endothermic peak that is observed when the resin is heated from room temperature at a heating rate of 20° C./minute (1st RUN) is measured, the resin is held for two minutes at (the melting point Tm1+40)° C. and then cooled to room temperature at a cooling rate of 20° C./minute, and then, when the resin is heated again from room temperature at a heating rate of 20° C./minute (2nd RUN), the peak top temperature of an endothermic peak of the 2nd RUN that is observed when the resin is heated again from room temperature at a heating rate of 20° C./minute is defined as the melting point Tm2. The onset temperature of the melting point Tm1 (temperature at the start of the rising of a peak) described below is defined as the onset temperature of the endothermic peak of the above-mentioned 1st RUN.

The difference ΔTm (Tm2–Tm1 onset temperature) between the melting point Tm2 and the onset temperature of the melting point Tm1 of the powdery liquid-crystal resin measured by a differential scanning calorimeter is preferably 30° C. or more and 90° C. or less, and more preferably 30° C. or more and 50° C. or less. By setting the difference ΔTm between the melting point Tm2 and the onset temperature of the melting point Tm1 to this range, it is possible to improve workability when hot-press molding and to make the thermal resistance of hot-press-molded articles more favorable.

The melt viscosity of the powdery liquid-crystal resin measured at a cylinder temperature 10 to 30° C. higher than the melting point Tm2 measured by a differential scanning calorimeter and a shear rate of 100 sec$^{-1}$ is 10 Pa·s or more and 1000 Pa·s or less, and more preferably 50 Pa·s or more and 800 Pa·s or less. A melt viscosity measured at a "cylinder temperature 10 to 30° C. higher than the melting point Tm2" means the melt viscosity measured at one temperature appropriately selected, in accordance with the type of the liquid-crystal resin, from among the cylinder temperatures 10 to 30° C. higher than the melting point Tm2, and the melt viscosity measured in all of the range of temperatures 10 to 30° C. higher than the melting point Tm2 need not necessarily be in the above-mentioned range. By setting the melt viscosity of the powdery liquid-crystal resin to the above-mentioned range, it is possible to make the appearance of hot-press-molded articles more favorable. The melt viscosity can be adjusted by adjusting the final polymerization temperature during melt polymerization of the liquid-crystal resin. For example, it is possible to set the melt viscosity to 10 to 200 Pa·s by setting the final polymerization temperature during melt polymerization of the liquid-crystal resin to above 300° C.

The shape of the powdery liquid-crystal resin is preferably fibrillar and the like in view of the bulk density being able to be easily adjusted to the above-mentioned range.

The methods for adjusting the bulk density, the particle diameter distribution, and/or the average particle diameter of the powdery liquid-crystal resin are not particularly limited. If the bulk density, the particle diameter distribution, and/or the average particle diameter of a powdery liquid-crystal resin obtained by means of the above-mentioned production method for a powdery liquid-crystal resin are within desired ranges, it is possible to use the powdery liquid-crystal resin as is, and if outside of the above-mentioned ranges, the powdery liquid-crystal resin obtained by means of the above-mentioned production method for a powdery liquid-crystal resin can be used by molding the resin into pellets, fibers, films, and the like, subjecting the resin to a milling treatment by dry-milling, wet-milling, and freeze-milling using a jet mill, a bead mill, a hammer mill, a ball mill, a cutter mill, a stone mill, and the like, and then adjusting the bulk density thereof. In addition, it is also possible to adjust bulk density using a method in which the liquid-crystal resin is dissolved in a solvent and then spray dried, an anti-solvent precipitation method for forming an emulsion in a solvent and then bringing the solvent into contact with an anti-solvent, an in-liquid drying method for forming an emulsion in a solvent and then removing an organic solvent by drying, and the like. It is also possible to use a method for obtaining a powdery liquid-crystal resin having a desired average particle diameter by mixing together a liquid-crystal resin and a non-liquid-crystal resin and then dissolving and removing the non-liquid-crystal resin with a solvent. In addition, it is also possible to use a method for obtaining a powdery liquid-crystal resin having the above-mentioned average particle diameter by subjecting an oligomer of a liquid-crystal resin to a milling treatment and then subjecting the milled resin to solid phase polymerization. Wet-milling is preferable in view of preventing bulk density from becoming too low and making cold-press molding difficult.

[Press-Molded Article]

The press-molded article according to the present embodiment is formed using the above-mentioned powdery liquid-crystal resin. That is, the press-molded article is a press-molded article of a powdery liquid-crystal resin having a bulk density of more than 0.05 g/cm$^3$ and 0.5 g/cm$^3$ or less. This press-molded article has excellent mechanical strength because the article is formed using a powdery liquid-crystal resin having a predetermined bulk density as described above. Other features of the powdery liquid-crystal resin are as described above. Thus, the descriptions thereof are omitted here.

The press-molded article according to the present embodiment has high mechanical strength, so the article can be preferably used in various applications such as filter media and mechanical components with low anisotropy and high thermal resistance. The shape and dimensions of the press-molded article are not particularly limited and the article can, for example, be formed into a sheet-like press-molded article. This press-molded article can be obtained by hot-press molding the powdery liquid-crystal resin.

[Production Method for Press-Molded Article]

First Embodiment

A production method for a press-molded article according to the first embodiment has a hot-pressing step of press-molding a powdery liquid-crystal resin at a mold temperature equal to or more than (a melting point–60)° C.

(Hot Pressing Step)

In the hot pressing step, the powdery liquid-crystal resin is press molded at a mold temperature equal to or more than (the melting point Tm2 measured by a differential scanning calorimeter−60)° C. By setting the mold temperature to equal to or more than (the melting point Tm2−60)° C., it is possible to decrease the orientation of the resin when hot-press molding and to produce hot-press-molded articles with a small anisotropy. For example, the mold temperature of a press molding machine into which the powdery liquid-crystal resin has been loaded is set to (Tm2−30)° C. or more and (Tm2+30)° C. or less, and preferably (Tm2−10)° C. or more and (Tm2+15)° C. or less, and then the resin is pressure molded. The pressure in this case is not particularly limited and can be set to a pressure at which the resin can be molded to a desired thickness. For example, the pressure can be set to 0.5 MPa or more and 10 MPa or less, and preferably 1 MPa or more and 5 MPa or less.

Second Embodiment

The production method for a press-molded article in the first embodiment may have a cold pressing step prior to the hot pressing step. That is, a production method for a press-molded article according to the second embodiment has a cold pressing step of press-molding a powdery liquid-crystal resin at a mold temperature equal to or less than a glass transition point and a hot pressing step of press-molding a molded article that was obtained in the cold pressing step at a mold temperature equal to or more than (the melting point Tm2 measured by a differential scanning calorimeter−60)° C. of the powdery liquid-crystal resin.

(Cold Pressing Step)

In the cold pressing step, a powdery liquid-crystal resin having the above-mentioned predetermined average aspect ratio is press molded (cold-press molded) at a mold temperature equal to or less than the glass transition point (Tg) of the powdery liquid-crystal resin. The resin can be formed into a press-molded article having higher mechanical strength by subjecting the resin to the cold pressing step and then hot-press molding the resin. For example, the powdery liquid-crystal resin is placed inside a mold of a press molding machine and then pressure molded at a mold temperature that is 0° C. or more and 100° C. or less, and preferably 10° C. or more and 40° C. or less. The pressure in this case is not particularly limited and can be set to a pressure at which the resin can be molded to a desired thickness. For example, it is possible to set a pressure of 1 MPa or more and 30 MPa or less, and preferably 5 MPa or more and 20 MPa or less.

A molded article that is obtained by press molding a powdery liquid-crystal resin having the above-mentioned predetermined bulk density at a mold temperature equal to or less than the glass transition point (Tg) of the powdery liquid-crystal resin has a high density with little gas such as air remaining in the inside thereof. Consequently, it is possible to further increase the mechanical strength of a press-molded article that is obtained by the hot-pressing step described below.

(Hot Pressing Step)

In the hot pressing step, the molded article that was obtained in the cold pressing step is press molded at a mold temperature equal to or more than (the melting point Tm2 measured by a differential scanning calorimeter−60)° C. of the powdery liquid-crystal resin. By setting the mold temperature to equal to or more than (the melting point Tm2−60)° C., the powdery liquid-crystal resin flows, making it possible to obtain a molded article with good mold reproducibility. For example, subsequent to the cold pressing step, the mold temperature of the press molding machine is set to (Tm2−30)° C. or more and (Tm2+30)° C. or less, and preferably (Tm2−10)° C. or more and (Tm2+15)° C. or less, and then the resin is pressure molded. The pressure in this case is not particularly limited and can be set to a pressure at which the resin can be molded to a desired thickness. For example, the pressure can be set to 0.5 MPa or more and 10 MPa or less, preferably 1 MPa or more and 8.5 MPa or less, and more preferably 1 MPa or more and 5 MPa or less.

<Other Steps>

The production methods for a press-molded article according to the first and second embodiments mentioned above may have other steps, such as a step of preparing a powder material for the press-molded article (powder material preparation step). The powder material preparation step can, for example, be made a step of obtaining a mixed material by mixing one or more liquid-crystal resins having the bulk density mentioned above and, as needed, an additive such as an inorganic filler using a conventional method, such as a method for mixing by shaking, a method for mixing involving milling by a ball mill and the like, and a method for mixing by agitation impellers such as a Henschel mixer.

The total content of the powdery liquid-crystal resin when preparing the resin so as to be a mixed material is preferably 50% by mass or more and more preferably 70% by mass or more in the powder material for press molding. The upper limit is not particularly limited and can, for example, be set to 95% by mass or less.

Examples of inorganic additives mixed with the powdery liquid-crystal resin include inorganic fine particles having an average particle diameter of 500 nm or less or 400 nm or less, and inorganic reinforcing materials having an average particle diameter of 1 μm or more and 100 μm or less. The material of the inorganic additive is not particularly limited and, for example, it is possible to use the same material as that of the inorganic filler that can be blended with the liquid-crystal resin mentioned above. By using inorganic fine particles having the above-mentioned average particle diameter, it is possible to increase the powder flowability and the dispersibility of the above-mentioned liquid-crystal resin fine particles. By using an inorganic reinforcing material having the above-mentioned average particle diameter, it is possible to further increase the strength of the resulting press-molded article. The average particle diameter can be measured by the same method as that mentioned above. The content of the inorganic additive is preferably 50% by mass or less and more preferably 30% by mass or less in the powder material.

EXAMPLES

The present invention will be explained more specifically by referring to examples below, but the present invention is not to be construed as being limited by these examples.

Liquid-crystal resins LCP1 to LCP3 used in the examples and comparative examples were produced in the manner described below.

Production Example 1

LCP1: Wholly Aromatic Polyester

After charging the below-described raw materials into a polymerization vessel, the temperature of the reaction system was raised to 140° C. and a reaction was allowed to proceed at 140° C. for one hour. Thereafter, the temperature was further raised to 360° C. over 5.5 hours. From that point, the pressure was reduced to 5 Torr (that is, 667 Pa) over 30 minutes and melt polymerization was performed while distilling acetic acid, excess acetic anhydride, and other low-boiling components. After the stirring torque reached a predetermined value, nitrogen was introduced to change the pressure from a reduced-pressure state to a pressurized state via normal pressure, a polymer was discharged from the lower part of the polymerization vessel, and the strands were pelletized to obtain pellets. The obtained pellets were heated from room temperature to 290° C. over 20 minutes under a nitrogen atmosphere, held for three hours, and then left to cool to obtain LCP1 pellets.

(Raw Materials)
4-hydroxybenzoic acid (HBA); 37 g (2 mol %)
6-hydroxy-2-naphthoic acid (HNA); 1218 g (48 mol %)
Terephthalic acid (TA); 560 g (25 mol %)
4,4'-dihydroxybiphenyl (BP); 628 g (25 mol %)
Metal catalyst (potassium acetate catalyst); 165 mg
Acylating agent (acetic anhydride); 1432 g Production Example 2

LCP2: Wholly Aromatic Polyester Amide

After charging the below-described raw materials into a polymerization vessel, the temperature of the reaction system was raised to 140° C. and a reaction was allowed to proceed at 140° C. for one hour. Thereafter, the temperature was further raised to 340° C. over 4.5 hours. From that point, the pressure was reduced to 10 Torr (that is, 1330 Pa) over 15 minutes and polycondensation was performed while distilling acetic acid, excess acetic anhydride, and other low-boiling components. After the stirring torque reached a predetermined value, nitrogen was introduced to change the pressure from a reduced-pressure state to a pressurized state via normal pressure, a polymer was discharged from the lower part of the polymerization vessel, and the strands were pelletized to obtain LCP2 pellets.

(Raw Materials)
4-hydroxybenzoic acid (HBA); 1380 g (60 mol %)
6-hydroxy-2-naphthoic acid (HNA); 157 g (5 mol %)
Terephthalic acid (TA); 484 g (17.5 mol %)
4,4'-dihydroxybiphenyl (BP); 388 g (12.5 mol %)
4-acetoxyaminophenol (APAP); 160 g (5 mol %)
Metal catalyst (potassium acetate catalyst); 110 mg
Acylating agent (acetic anhydride); 1659 g Production Example 3

LCP3: Wholly Aromatic Polyester

After charging the below-described raw materials into a polymerization vessel, the temperature of the reaction system was raised to 140° C. and a reaction was allowed to proceed at 140° C. for one hour. Thereafter, the temperature was further raised to 330° C. over 3.5 hours. From that point, the pressure was reduced to 10 Torr (that is, 1330 Pa) over 15 minutes and polycondensation was performed while distilling acetic acid, excess acetic anhydride, and other low-boiling components. After the stirring torque reached a predetermined value, nitrogen was introduced to change the pressure from a reduced-pressure state to a pressurized state via normal pressure, a polymer was discharged from the lower part of the polymerization vessel, and the strands were pelletized to obtain LCP3 pellets.

(Raw Materials)
4-hydroxybenzoic acid (HBA); 2524 g (79.3 mol %)
6-hydroxy-2-naphthoic acid (HNA), 867 g (20 mol %)
Terephthalic acid (TA); 27 g (0.3 mol %)
Metal catalyst (potassium acetate catalyst); 150 mg
Acylating agent (acetic anhydride); 2336 g Example 1

Using a Masscolloider (MKZA10-15JP manufactured by MASUKO SANGYO CO., LTD), LCP1 was subjected to a wet-milling treatment in an environment of a water temperature of 35° C. and then spray dried to obtain a powdery liquid-crystal resin. The bulk density, the particle diameter distribution width, the average particle diameter and maximum particle diameter, the degree of crystallinity, the melting points (Tm2 and Tm1 onset temperature), and the melt viscosity of this powdery liquid-crystal resin were measured by the methods indicated below.

Using 2.8 g of the powdery liquid-crystal resin that was obtained, a molded article that is 40 mm in radius×1 mm in thickness was made under conditions of a mold temperature of 23° C. and a pressure of 8.5 MPa using a tablet molding press ("TYPE. M. No. 30" manufactured by Maekawa Testing Machine MFG. Co., Ltd) (cold pressing step). Subsequently, the mold temperature of the hot-press molding machine was increased and a molded article that is 40 mm in radius×1 mm in thickness was made under the conditions of a mold temperature of 355° C. and a pressure of 2 MPa (hot pressing step). A drop test was performed by the method indicated below for the molded article that was obtained.

Example 2

A press-molded article was obtained in the same manner as in Example 1 except that LCP2 was used instead of LCP1 and the temperature of the hot pressing step was changed as indicated in Table 1. Various physical properties of the powdery liquid-crystal resin and the molded article that were obtained were measured in the same manner as in Example 1.

Example 3

A press-molded article was obtained in the same manner as in Example 2 except that the cold pressing step was not performed. Various physical properties of the powdery liquid-crystal resin and the molded article that were obtained were measured in the same manner as in Example 1.

Comparative Example 1

A composition was obtained by melt kneading at a cylinder temperature of 340° C. and a screw rotation speed of 125 rpm using a "TEX-α" twin-screw extruder (the product of the number of nozzle openings and the area of each opening being 300 mm$^2$) manufactured by The Japan Steel Works, Ltd., such that a polystyrene ("SGP10" manufactured by PS Japan Corporation, glass transition point Tg of 100° C., melt viscosity of 27 Pa·s (cylinder temperature of 340° C. and a shear rate of 1000 sec$^{-1}$)) was 900 parts by mass with respect to 100 parts by mass of LCP3. The composition was extruded from a circular nozzle at a resin extrusion rate of 10 kg/hr. to obtain strands, which were cut and pelletized. At this time, the ratio (nS/Q) of the product nS (mm²) of the number n of nozzle openings and the area S of each opening and the resin extrusion amount Q per hour (kg/hr.) was 30.

100 g of the composition pellets that were obtained were added into 900 g of toluene that was heated to 40° C. in a 2 L flask and stirred for 30 minutes, and the polystyrene was dissolved in the toluene. Insoluble components were collected by suction filtration and thoroughly subjected to additional washing with 90 g of toluene at 40° C. The additional washing was performed three times. After the additional washing, the insoluble components were filtered through a 1 μm filter and then collected and dried to obtain a powdery liquid-crystal resin.

Using the powdery liquid-crystal resin that was obtained, a press-molded article was obtained in the same manner as in Example 1 except that the temperature of the hot pressing step was changed. Various physical properties of the powdery liquid-crystal resin and the molded article that were obtained were measured in the same manner as in Example 1.

Comparative Example 2

LCP2 was subjected to a freeze milling treatment using a mesh mill type pulverizer (HA-2542 manufactured by HORAI Co., Ltd.) to obtain a powdery liquid-crystal resin. Using the powdery liquid-crystal resin that was obtained, a press-molded article was obtained in the same manner as in Example 2. Various physical properties of the powdery liquid-crystal resin and the molded article that were obtained were measured in the same manner as in Example 1.

[Measurement]

The methods for measuring the bulk density, the particle diameter distribution width, the average particle diameter and maximum particle diameter, the degree of crystallinity, the melting points (Tm2 and Tm1 onset temperature), and the melt viscosity of the powdery liquid-crystal resins, and the drop test method for the press-molded articles, are as described below. The results are shown in Table 1.

(Bulk Density)

Using a powder flowability analyzer ("FT4 Powder Rheometer" manufactured by Freeman Technology), a cylindrical container having a diameter of 50 mm was filled with powdery liquid-crystal resins having a volume of 85 ml and the weights were measured. Thereafter, the resins were compacted at a pressure of 15 KPa using a Vented Piston having a diameter of 48 mm, and the value obtained by dividing the weight by the volume after compaction was calculated as the bulk density.

(Melt Viscosity)

Using a capillary type rheometer (Capilograph 1D manufactured by Toyo Seiki Seisaku-sho, Ltd.: piston diameter 10 mm), the apparent melt viscosity was measured in compliance with ISO 11443 under the conditions below. For the measurement, an orifice with an inner diameter of 1 mm and a length of 20 mm was used.

Cylinder Temperature:
370° C. (LCP1)
350° C. (LCP2)
340° C. (LCP3)
Shear rate: 100 sec$^{-1}$ (Particle Diameter Distribution Width, Average Particle Diameter, and Maximum Particle Diameter)

Using a laser diffraction/scattering particle diameter distribution analyzer (LA-960 manufactured by HORIBA, Ltd.) and methanol as a dispersion solvent, the particle diameter distribution width, the average particle diameter, and the maximum particle diameter were measured. The average particle diameter is a volume-based arithmetic average particle diameter.

(Degree of Crystallinity)

From the diffraction information (wide angle X-ray diffraction pattern or wide angle X-ray diffraction profile) that is obtained using an X-ray diffraction device (D2 PHASER manufactured by Bruker Corporation), the information was divided into a scattering region derived from an amorphous portion and a scattering region derived from a crystal portion, and the degree of crystallinity was measured according to formula (I) below in compliance with the method described in W. Ruland, *Acta Cryst.*, 14, 1180 (1961).

Degree of crystallinity (%)=[crystal portion-derived scattering intensity/(crystal portion-derived scattering intensity+amorphous portion-derived scattering intensity)]×100 (I)

(Melting Point Tm2 and Melting Point Tm1 Onset Temperature)

Using a differential scanning calorimeter (DSC7000X manufactured by Hitachi High-Tech Science Corporation), the peak top temperature (melting point Tm1) of an endothermic peak that is observed when the resin is heated from room temperature at a heating rate of 20° C./minute (1st RUN) was measured, the resin was held for two minutes at a temperature of (the melting point Tm1+40)° C. and then cooled to room temperature at a cooling rate of 20° C./minute, and then the resin was heated again from room temperature at a heating rate of 20° C./minute, and the peak top temperature of an endothermic peak of the 2nd RUN that is observed at this time was measured as the melting point Tm2. In addition, the onset temperature of the endothermic peak of the 1st RUN (temperature at which the peak starts to rise) was measured as the melting point Tm1 onset temperature.

(Glass Transition Point)

Using a dynamic viscoelastic measurement device (RSA-III manufactured by TA Instruments), the glass transition point was measured.

(Drop Test)

Molded articles were dropped from a height of 50 cm and evaluated according to the criteria below.
3: The molded article did not break.
2: The molded article did not break, but there were cracks.
1: The molded article broke.

TABLE 1

| | | EXAMPLE 1 | EXAMPLE 2 | EXAMPLE 3 | COMPARATIVE EXAMPLE 1 | COMPARATIVE EXAMPLE 2 |
|---|---|---|---|---|---|---|
| LIQUID-CRYSTAL RESIN | | LCP1 | LCP2 | LCP2 | LCP3 | LCP2 |
| BULK DENSITY | g/cm³ | 0.07 | 0.11 | 0.11 | 0.67 | 0.05 |
| PARTICLE DIAMETER DISTRIBUTION WIDTH | — | 6.1 | 8.3 | 8.3 | 2.4 | 7.9 |

TABLE 1-continued

|  |  | EXAMPLE 1 | EXAMPLE 2 | EXAMPLE 3 | COMPARATIVE EXAMPLE 1 | COMPARATIVE EXAMPLE 2 |
| --- | --- | --- | --- | --- | --- | --- |
| AVERAGE PARTICLE DIAMETER | μm | 75 | 63 | 63 | 12 | 408 |
| DEGREE OF CRYSTALLINITY | % | 62 | 53 | 53 | 26 | 53 |
| MELTING POINT Tm2 | °C. | 348 | 335 | 335 | 322 | 335 |
| ΔTm | °C. | 33 | 38 | 38 | 48 | 38 |
| MELT VISCOSITY | Pa·s | 112 | 57 | 57 | 72 | 57 |
| MAXIMUM PARTICLE DIAMETER | μm | 103 | 129 | 129 | 27 | 1532 |
| MAXIMUM PARTICLE DIAMETER/AVERAGE PARTICLE DIAMETER | — | 1.8 | 2.4 | 2.4 | 2.5 | 3.8 |
| GLASS TRANSITION POINT | °C. | 140 | 110 | 110 | 110 | 110 |
| COLD PRESSING STEP | TEMPERATURE | °C. | 23 | 23 | — | 23 | 23 |
| COLD PRESSING STEP | PRESSURE | MPa | 8.5 | 8.5 | — | 8.5 | 8.5 |
| HOT PRESSING STEP | TEMPERATURE | °C. | 355 | 340 | 340 | 330 | 340 |
| HOT PRESSING STEP | PRESSURE | MPa | 2 | 2 | 2 | 2 | 2 |
| DROP TEST | — | 3 | 3 | 2 | 1 | 1 |

The invention claimed is:

1. A production method for a press-molded article, the method comprising a cold pressing step of press-molding a powdery liquid-crystal resin having a bulk density of more than 0.05 g/cm³ and 0.5 g/cm³ or less at a mold temperature equal to or less than a glass transition point, and a hot pressing step of press-molding a molded article that was obtained in the cold pressing step at a mold temperature equal to or more than (the melting point Tm2 measured by a differential scanning calorimeter−60)° C. of the powdery liquid-crystal resin, wherein the bulk density is a value obtained by filling a cylindrical container with a diameter of 50 mm with 85 mL of the powdery liquid-crystal resin and measuring its weight using a powder flowability analyzer, then compressing it at a pressure of 15 KPa using a Vented Piston with a diameter of 48 mm, and dividing the weight by the volume after compression.

* * * * *